United States Patent
Conlon et al.

(10) Patent No.: US 7,867,124 B2
(45) Date of Patent: Jan. 11, 2011

(54) OUTPUT SPLIT ELECTRICALLY-VARIABLE TRANSMISSION WITH ELECTRIC PROPULSION USING ONE OR TWO MOTORS

(75) Inventors: Brendan M. Conlon, Rochester Hills, MI (US); Peter J. Savagian, Bloomfield Hills, MI (US); Alan G. Holmes, Clarkston, MI (US); Michael O. Harpster, Jr., Oakland Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 485 days.

(21) Appl. No.: 11/852,639

(22) Filed: Sep. 10, 2007

(65) Prior Publication Data

US 2009/0082171 A1  Mar. 26, 2009

(51) Int. Cl.
F16H 3/72     (2006.01)
F16H 37/06    (2006.01)
B60K 6/445    (2007.10)

(52) U.S. Cl. ............ 475/5; 475/8; 475/10; 903/910; 903/913; 903/917; 180/65.235

(58) Field of Classification Search ........... 475/5, 475/4, 8, 10; 903/903, 910, 913, 917, 919
See application file for complete search history.

(56) References Cited

U.S. PATENT DOCUMENTS

| | | | |
|---|---|---|---|
| 5,343,970 | A | 9/1994 | Severinsky |
| 6,209,672 | B1 | 4/2001 | Severinsky |
| 6,338,391 | B1 | 1/2002 | Severinsky et al. |
| 6,527,658 | B2 * | 3/2003 | Holmes et al. .......... 475/5 |
| 6,554,088 | B2 | 4/2003 | Severinsky et al. |
| 6,558,289 | B2 * | 5/2003 | Chung .......................... 477/3 |
| 6,692,394 | B2 | 2/2004 | Takenaka |
| 7,104,347 | B2 | 9/2006 | Severinsky et al. |
| 7,128,675 | B2 * | 10/2006 | Klemen et al. ............. 475/5 |
| 7,217,211 | B2 * | 5/2007 | Klemen et al. ............. 475/5 |
| 7,219,757 | B2 | 5/2007 | Tomita et al. |
| 7,220,203 | B2 * | 5/2007 | Holmes et al. ............ 475/5 |
| 7,237,634 | B2 | 7/2007 | Severinsky et al. |
| 7,278,941 | B2 * | 10/2007 | Holmes et al. ............ 475/5 |
| 7,338,401 | B2 * | 3/2008 | Klemen et al. ............. 475/5 |
| 7,392,871 | B2 | 7/2008 | Severinsky et al. |

(Continued)

OTHER PUBLICATIONS

Office Action Mailed May 24, 2010 for U.S. Appl. No. 11/939,610.

(Continued)

*Primary Examiner*—Tisha D Lewis
(74) *Attorney, Agent, or Firm*—Quinn Law Group, PLLC

(57) ABSTRACT

An electrically-variable transmission is provided with input member and output member, first and second motor/generators, a first planetary gear set and a final drive gearset. Two or three torque-transmitting mechanisms that are selectively engagable alone or in different combinations to establish at least one forward electric-only operating mode including a series mode, an output split mode, and at least one neutral mode including a purely neutral mode and a neutral battery charge mode. The transmission optionally includes a one-way clutch selected from the group of friction clutch and dog clutch, or is a lockable one-way clutch, for enabling low loss forward operation, regenerative braking functionality, and/or reverse vehicle operation.

21 Claims, 3 Drawing Sheets

U.S. PATENT DOCUMENTS

| | | |
|---|---|---|
| 7,455,134 B2 | 11/2008 | Severinsky et al. |
| 7,494,435 B2 | 2/2009 | Bucknor et al. |
| 7,520,353 B2 | 4/2009 | Severinsky et al. |
| 7,559,388 B2 | 7/2009 | Severinsky et al. |
| 7,712,560 B2 | 5/2010 | Kozarekar |
| 2008/0125264 A1 | 5/2008 | Conlon et al. |
| 2008/0207373 A1* | 8/2008 | Conlon .......................... 475/5 |
| 2009/0176610 A1* | 7/2009 | Conlon .......................... 475/5 |
| 2009/0281694 A1* | 11/2009 | Conlon et al. ................. 701/51 |

OTHER PUBLICATIONS

Office Action Mailed Oct. 5, 2010 for U. S. Appl. No. 11/939,610.

* cited by examiner

| C1 | C2 | C3 | MODE (#) |
|---|---|---|---|
| x | | | 1 MOTOR ELECTRIC - ONLY (1) |
| x | | x | SERIES (2) |
| | x | x | OUTPUT SPLIT (3) |
| | | | NEUTRAL (4) |
| | | x | NEUTRAL / BATTERY CHARGE (5) |
| | x | | 2 MOTOR ELECTRIC - ONLY (6) |
| x | x | | TRANSITION |

| C1 | C2 | ENGINE | MODE (#) |
|---|---|---|---|
| x | | OFF | 1 MOTOR ELECTRIC - ONLY (1) |
| x | | ON | SERIES (2) |
| | x | ON | OUTPUT SPLIT (3) |
| | | OFF | NEUTRAL (4) |
| | | ON | NEUTRAL/BATTERY CHARGE (5) |
| x | x | OFF | TRANSITION |

OUTPUT SPLIT ELECTRICALLY-VARIABLE TRANSMISSION WITH ELECTRIC PROPULSION USING ONE OR TWO MOTORS

TECHNICAL FIELD

The invention relates to a series/output split electrically-variable transmission having at least one electric-only low range/series mode, at least one neutral mode, and a high range/output split mode.

BACKGROUND OF THE INVENTION

Electrically-variable transmissions (EVTs) typically have an input member connected to an engine, as well as one or two motor/generators that are connected to different members of planetary gear sets to enable one or more electrically-variable modes of operation or modes, fixed speed ratio modes, and an electric-only (battery powered) mode. An "electrically-variable" mode is an operating mode in which the speed ratio between the transmission input and output members is determined by the speed of one of the motor/generators.

EVTs may improve vehicle fuel economy in a variety of ways. For instance, the engine may be turned off at idle, during periods of deceleration and braking, and during periods of relatively low speed or light vehicle load operation to thereby eliminate efficiency losses incurred due to engine drag. Captured braking energy via regenerative braking, or energy stored by one of the motors acting as a generator during periods when the engine is operating, is utilized during these "engine off" periods to extend the period or duration during which the engine is off, to supplement engine torque or power, to operate the vehicle at a lower engine speed, and/or to supplement accessory power supplies. Transient demand for engine torque or power is supplemented by the motor/generators during "engine on" periods, allowing for downsizing of the engine without reducing apparent vehicle performance. Additionally, the motor/generators are very efficient in accessory power generation, and electric power from the battery serves as an available torque reserve allowing operation at a relatively low transmission speed ratio.

Electrically variable modes may be classified as input-split, output-split, compound-split, or series modes. Input-split modes gear one motor/generator such that its speed varies in direct proportion to the transmission output, and the other motor/generator such that its speed is a linear combination of the input and output member speeds. Output-split modes have one motor/generator geared such that its speed varies in direct proportion to the transmission input member, and have the other motor/generator geared such that its speed is a linear combination of the input member and the output member speeds. A compound-split mode has both motor/generators geared such that their speeds are linear combinations of the input and output member speeds, but neither is in direct proportion to either the speed of the input member or the speed of the output member. A series mode has one motor/generator geared such that its speed varies in direct proportion to the speed of the transmission input member, and another motor/generator geared such that its speed varies in direct proportion to the speed of the transmission output member. There is no direct mechanical power transmission path between the input and output members when operating in series mode, and therefore all power must be transmitted electrically.

A series propulsion system is a system in which energy follows a path from an engine to an electric storage device, and then to an electrical motor/generator which applies power to rotate the drive members. In other words, there is no direct mechanical connection between the engine and the drive members in a series propulsion system, unlike parallel propulsion systems. Therefore, transmissions with relatively large battery electric propulsion capability, and relatively small engine propulsion capability, have heretofore relied largely on what has been designated as a series-hybrid transmission or propulsion system.

SUMMARY OF THE INVENTION

An electrically-variable transmission (EVT) is provided with a forward low range electrically-variable series operating mode in which the engine is on, a forward low range electric-only operating mode in which the engine is off, an electrically variable output split operating mode, and at least one neutral mode. Shifting between the available modes may be accomplished with clutch-to-clutch shifts, potentially decreasing shift times versus synchronous shifts that are executed purely by changing motor speeds while operating in an EVT mode.

Specifically, the EVT includes an input member, an output member, first and second motor/generators, and a first planetary gear set representable by a first three-node lever having a first node, a second node, and a third node. The first motor/generator is selectively connectable with the third node, and the second motor/generator is continuously connected with the first node. The second node is continuously connected for common rotation with the output member. The transmission includes at least two torque-transmitting mechanisms or clutches that are selectively engageable alone or in different combinations to connect different ones of the nodes to one another or to a stationary member, thereby establishing the various operating modes.

In one aspect of the invention, the EVT has two clutches, and the first motor/generator is continuously connected with the engine. The two clutches are selectively engagable alone or in different combinations to connect different ones of the first, second, third nodes to establish a forward low range electrically-variable series mode in which the engine is on, a one-motor electric-only operating mode in which the engine is off, an electrically variable output split operating mode, and at least one neutral mode, and the second torque-transmitting mechanism is selectively disengagable to disconnect the engine to enable offline start of the engine.

In another aspect of the invention, the first torque-transmitting mechanism connects the third node to the stationary member, and the second torque-transmitting mechanism connects the first motor/generator to the third node.

In another aspect of the invention, the first torque-transmitting mechanism is a one-way clutch positioned in parallel with a dog clutch. The one-way clutch enables low loss forward propulsion, and the dog clutch enables regenerative braking and reverse vehicle operation.

In another aspect of the invention, the EVT has a third torque-transmitting mechanism that is selectively disengagable to disconnect the first motor/generator from the input member to establish another electric-only mode that is a two-motor mode suitable for minimizing losses across both of the first and second motor/generators and for reducing an operating speed of the second motor/generator.

In another aspect of the invention, disengagement of the first and second torque-transmitting mechanisms and engagement of the third torque-transmitting mechanism establishes a neutral battery charge mode as one of the neutral modes, with the neutral battery charge mode operable for charging the energy storage device.

In another aspect of the invention, the EVT is operable for starting the engine while the EVT is in one-motor electric-only mode, thereby transitioning to series mode, and is further operable for transitioning directly from series mode to output split mode by momentarily disengaging the third torque-transmitting mechanism while in series mode to allow the transmission to synchronously shift to output split mode without requiring engine speed to drop to zero.

In another aspect of the invention, the EV modes includes a two-motor electric-only mode, and the EVT is operable for transitioning directly from the two motor electric-only mode to the output split mode via at least one of an online start, an offline start with clutch-to-clutch shift, and an offline start with a synchronous shift.

In another aspect of the invention, an energy storage device is operatively connected to the first and second motor/generators for providing power to and receiving power therefrom. The energy storage device is operatively connectable with an offboard power supply for recharging thereof, and engagement of two of the torque-transmitting mechanisms establishes an electric-only mode in which the input member does not rotate and the second motor/generators acts as a motor utilizing power from the recharged energy storage device to provide driving torque at the output member.

In another aspect of the invention, the first planetary gear set includes a sun gear, a ring gear, and a carrier member, with the sun gear being continuously connected to the second motor/generator, the ring gear being selectively connectible to the first motor/generator through the second torque-transmitting mechanism and selectively connectible to the stationary member through the first torque-transmitting mechanism, and the carrier member is continuously connected to the output member.

In another aspect of the invention, a hybrid powertrain includes an EVT, an engine, an input member of the EVT, an output member of the EVT, a stationary member of the EVT, a final drive gearset, and first and second motor/generators. The powertrain further includes an energy storage device operatively connected to the first and second motor/generators for providing power to and receiving power from the first and second motor/generators, wherein the energy storage device is operatively connectable with an offboard power supply for recharging thereof.

The hybrid powertrain further includes a first planetary gear set representable by a first three-node lever of a lever diagram having a first, second, and third node, and a final drive gearset. The output member is continuously connected with the final drive gearset, and the first motor/generator and input member are selectively connectable with the third node. The second motor/generator is continuously connected with the first node, and the second node is continuously connected for common rotation with the output member.

A first torque-transmitting mechanism is selectively engagable to connect the third node to the stationary member. A second torque-transmitting mechanism is selectively engagable to connect the first motor/generator with the third node. A third torque-transmitting mechanism is selectively engagable to connect the input member with the first motor/generator, wherein engagement of selected ones of the first, second, and third torque-transmitting mechanisms alone or in different combinations establishes multiple forward electric-only modes, a series mode, an output split mode, and multiple neutral modes. Engagement of the first torque-transmitting mechanism and disengagement of the second torque transmitting mechanism establishes an electric-only mode in which the input member does not rotate and the second motor/generator acts as a motor utilizing power from the recharged energy storage device to provide driving torque at the output member.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
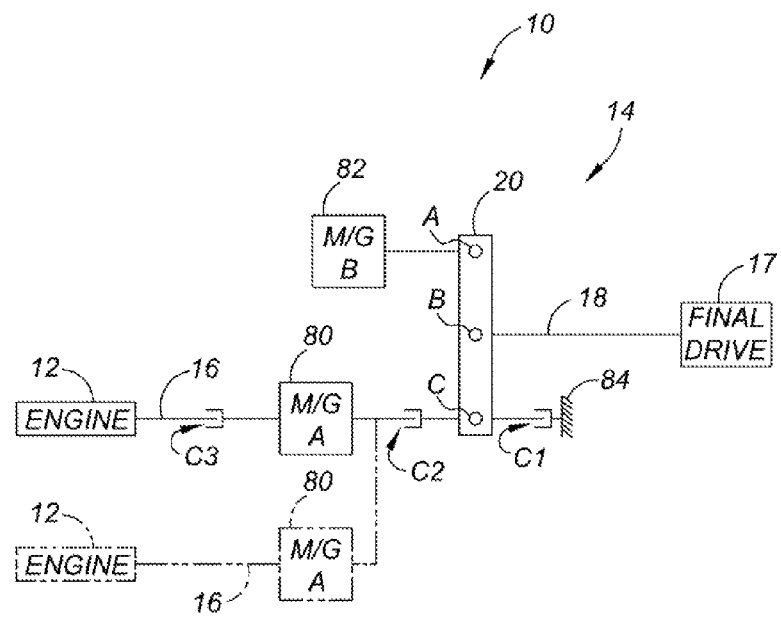
FIG. 1 is a schematic illustration of a transmission in lever diagram form having a three-node lever and a final drive assembly.

Referring to the drawings, wherein like reference numbers refer to like components, FIG. 1 illustrates a hybrid powertrain 10 having an engine 12 connected to an electrically-variable transmission 14. Transmission 14 is designed to receive at least a portion of its driving power from engine 12 in a plurality of its various operating modes, as discussed below with reference to FIGS. 3a and 3b. Engine 12 has an output shaft or member that serves as an input member 16 of transmission 14. A final drive unit or assembly 17 is operatively connected to an output shaft or member 18 of transmission 14.

Transmission 14 includes a three-node lever 20 representing a first planetary gear set having a first, a second, and a third member, which are represented by nodes A, B, and C, respectively. The members may be a ring gear member, a sun gear member, and a carrier member, although not necessarily in that particular order. As used herein, a "node" is a component of a transmission, such as a ring gear member, a carrier member, or a sun gear member, which is characterized by a rotational speed and which can act as a junction of torques applied to that component from other components, and by that component to other components. The other components which may interact with a given node include other coaxial members of the same set of planetary gears which appear as other nodes on the same lever. The other components which may interact with a given node also include interconnections to members of other planetary gear sets which appear as nodes on another lever (not shown), such as may be included within final drive assembly 17, a stationary member 84 such as a transmission case, and other transmission members, such as input member 16 or output member 18. As indicated above, within the scope of the invention final drive assembly 17 may include a planetary gearset, one or more parallel shaft gearsets (not shown), and/or a chain transfer mechanism (not shown).

Transmission 14 has multiple interconnections. A motor/generator 82 (also referred to as M/G B) is continuously connected with node A of lever 20. Node B is continuously connected to output member 18 for common rotation therewith. Input member 16 is continuously connected with engine 12. Another motor/generator 80 (also referred to as M/G A) is selectively connectable with node C of lever 20 for common rotation therewith. Finally, input member 16 may be either selectively connectable with motor/generator 80 (M/G A), or alternately may be continuously connectable with motor/generator 80 (M/G A) as shown in phantom, and as described later hereinbelow.

Transmission 14 also has several selectively engagable torque-transmitting mechanisms that provide various vehicle operating modes, as described below. Torque-transmitting mechanism C3, which is a rotating clutch referred to hereinafter for simplicity as clutch C3, is selectively engagable to connect input member 16 with motor/generator 80 (M/G A). Torque-transmitting mechanism C2, also a rotating clutch and referred to hereinafter for simplicity as clutch C2, is selectively engagable to connect motor/generator 80 (M/G A) with node C of lever 20. Torque-transmitting mechanism C1, referred to hereinafter for simplicity as brake C1, is selectively engagable to ground node C of lever 20 to stationary member 84, such as a casing or housing for transmission 14.

Figure 2:
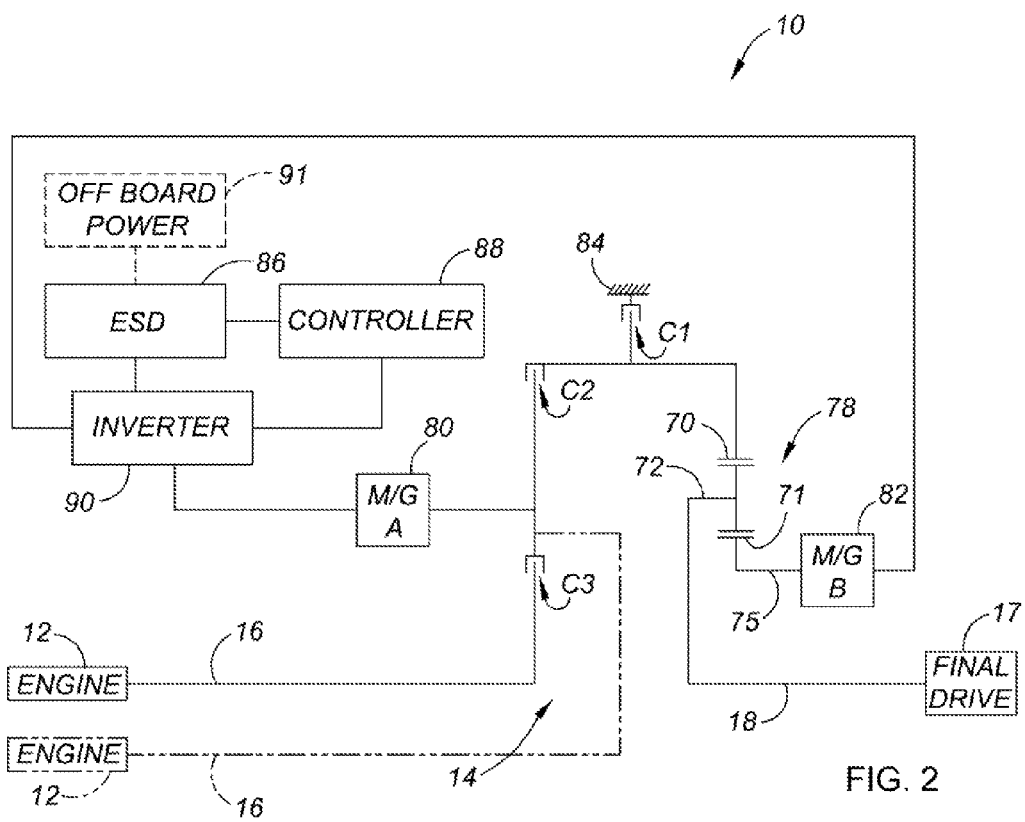
FIG. 2 is a stick diagram of an embodiment of the transmission of FIG. 1.

Referring to FIG. 2, a stick diagram of a preferred embodiment of transmission 14 of powertrain 10 is shown with motor/generator 80 (M/G A) selectively connectable with input member 16, and thus with engine 12, through clutch C3. Motor/generator 80 (M/G A) is also selectively connectible with an outer ring gear member 70 of a planetary gear set 78, with ring gear member 70 selectively connectible to stationary member 84 via brake C1. Motor/generator 82 (M/G B) is continuously connected to an inner sun gear member 71 via interconnecting member 75 to rotate in conjunction therewith. A carrier member 72 is operatively connected to final drive assembly 17 through output member 18.

Powertrain 10 preferably has an onboard energy storage device 86, abbreviated ESD 86 hereinafter for simplicity, that is operatively connected to each of the respective motor/generators 80, 82 such that motor/generators 80, 82 may selectively transfer power to or receive power from ESD 86. As used herein, an "onboard" energy storage device is any energy storage device that is mounted on the vehicle (not shown) to which powertrain 10 with motor/generators 80 and 82 are also mounted. ESD 86 may be, for example, one or more batteries or battery packs. Other onboard energy storage devices, such as fuel cells or capacitors, which have the ability to provide, and/or store and dispense, sufficient electric power may be used in combination with or in place of batteries.

An electronic control unit or controller 88 is operatively connected to ESD 86 to control the distribution of power to or from ESD 86 as needed. ESD 86 and controller 88 are shown and described with respect to the embodiments of FIGS. 2, 5a, and 5b. Operating data gathered by sensors, such as the speed of input member 16 and output member 18, may be provided to controller 88 as well, for various uses, such as when operating in a regenerative braking mode. As will be understood by those of ordinary skill of the art, regenerative braking capability may be accomplished by using controller 88 to balance torque from engine 12, from motor/generator 80 (M/G A), and from motor/generator 82 (M/G B) during braking to provide the desired deceleration rate of output member 18.

ESD 86 is preferably connected to a DC-to-AC power invertor 90, labeled "inverter" in FIG. 2 for simplicity, and is also preferably configured to be rechargeable by an offboard power supply system 91 when used with a plug-in hybrid vehicle. As used herein, an "offboard" power supply is a power supply that is not mounted on the vehicle (not shown) with powertrain 10, is not integral with transmission 14, and is operatively connected to ESD 86 only during recharging thereof, such as would occur in a plug-in hybrid vehicle application. Different offboard power supply systems that establish connectivity between ESD 86 and an offboard power supply system 91 for recharging of ESD 86 are shown and described with respect to FIGS. 4a, 4b, and 4c.

Figures 3A, 3B, 4A, 4B, 4C:
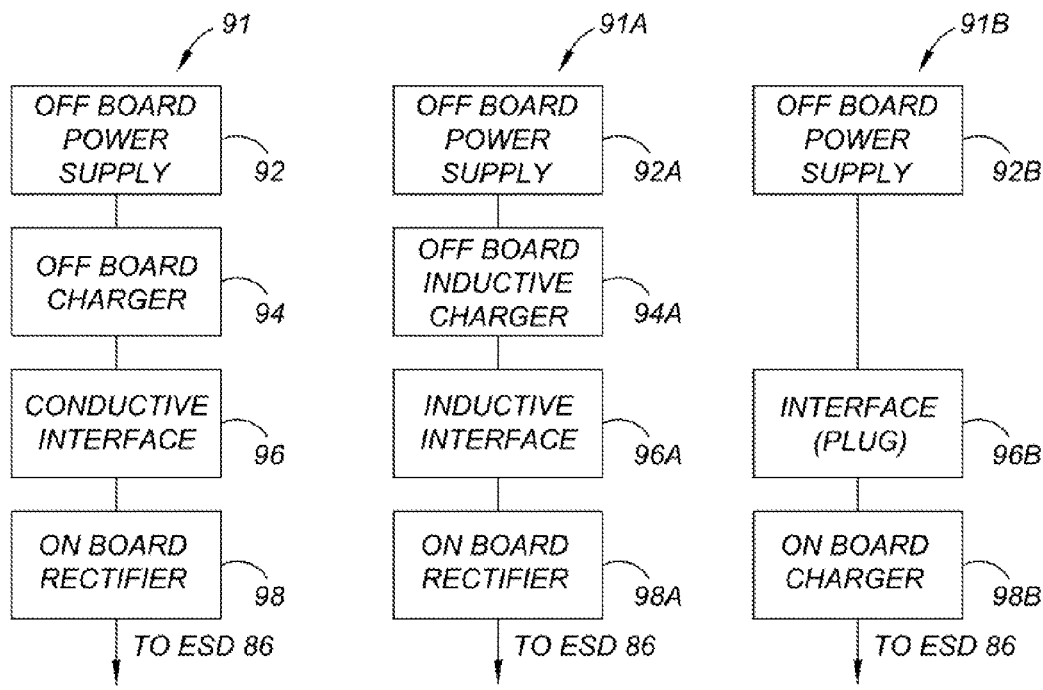
FIG. 3a is a truth table for the transmission shown in FIG. 1.
FIG. 3b is a truth table for an alternate transmission shown in FIG. 5B.
FIGS. 4a-4c are schematic illustrations of different offboard power supply systems for charging a battery used with the motor/generators in the transmission embodiments of FIGS. 2, 5a, and 5b.

Referring to FIG. 4a, offboard power supply system 91 is illustrated. Offboard power supply system 91 includes an offboard power supply 92 and an offboard charger 94 operatively connected with the offboard power supply 92, both of which are offboard of (i.e., not mounted onboard of) a vehicle having any of the transmission embodiments described herein. Instead, an onboard/offboard conductive interface 96, such as an electrical outlet and plug, permits selective connection of the offboard components (the offboard power supply 92 and offboard charger 94) with onboard ESD 86, optionally through an onboard rectifier 98 that is necessary only if the charger 94 supplies alternating current. The transmission embodiments described herein that utilize such an offboard power supply system 91 may be referred to as plug-in hybrid transmissions. The charger 94 is an offboard conductive-type charger that regulates the flow of electrical power from the offboard power supply 92 to ESD 86. When ESD 86 is sufficiently recharged, the connection through interface 96 is terminated, and the recharged ESD 86 is then used as discussed herein to power motor/generators 80, 82, such as in the electric-only mode.

Referring to FIG. 4b, an alternate offboard power supply system 91A is illustrated using an offboard inductive-type charger 94A to regulate the flow of power from an offboard power supply 92A, through an onboard/offboard inductive interface 96A, to ESD 86. Powerflow from the inductive interface 96A is optionally through an onboard rectifier 98A, which is required if the charger 94A provides alternating current. The offboard inductive charger 94A may be an electrical coil that establishes a magnetic field when powered by the offboard power supply 92A. The inductive interface 96A may be a complementary coil that connects the offboard components (offboard power supply 92A and offboard inductive charger 94A) with the onboard components (onboard rectifier 98A and ESD 86) when positioned close enough to the offboard inductive charger 94A during recharging to allow a magnetic field generated by electrical power flowing in the inductive charger 94A to cause electrical power to flow to the onboard rectifier 98A and then to the battery 86. When ESD 86 is sufficiently recharged, the inductive interface 96A is no longer positioned near the offboard inductive charger 94A, and the recharged ESD 86 is then used as discussed herein to power the motor/generators 80, 82, such as in the electric-only mode.

Referring to FIG. 4c, an alternate offboard power supply system 91B is illustrated using an offboard power supply 92B and an on board charger 98B, as well as an interface 96B, such as an electrical outlet or plug, that permits selective connection of the offboard component (the offboard power supply 92B) with onboard charger 98B. The onboard charger 98B is connectable with an onboard ESD 86 (see FIGS. 2, 5a, and 5b). The transmission embodiments described herein that utilize such an offboard power supply system 91B may be used referred to as plug-in hybrid transmissions. The charger 98B is an onboard conductive-type charger that regulates the flow of electrical power from offboard power supply 92B to ESD 86. When ESD 86 is sufficiently recharged, the connection through interface 96B is terminated, and the recharged ESD 86 is then used as discussed herein to power motor/generators 80, 82, such as in the electric-only mode.

Referring to the truth table shown in FIG. 3a, the following six operating modes of powertrain 10 of FIGS. 1 and 2, as well as FIGS. 5a and 5b described below, are summarized, followed by a detailed description. Mode 1 (1 Motor Electric-Only Mode) is an electric-only mode normally used with engine 12 off, but which may be briefly used with engine 12 on during mode transitions as described herein. Mode 2 (Series Mode) is an electrically variable series mode normally used when engine 12 is on, or when starting or stopping engine 12.

Mode 3 (Output Split Mode) is a high-range output-split mode usable at relatively high vehicle speeds and/or light vehicle loads. This mode is also normally used when engine 12 is on, or when starting or stopping engine 12, as described herein. Mode 4 (Neutral) is a mode which acts to disconnect motor/generator 82 (M/G B) from output member 18. Mode 5 (Neutral/Battery Charge Mode) enables ESD 86 (see FIG. 2) to be charged by selectively connecting motor/generator 80 (M/G A) to engine 12. Finally, Mode 6 (2 Motor Electric-Only Mode) allows both motor/generators 80 and 82 (M/G A and M/G B, respectively) to react a portion of the vehicle propulsion torque, thus allowing the speed of each motor/generators 80 and 82 to be varied in order to split power between the motor/generators 80 and 82, as well as to minimize losses in the motor/generators 80, 82 and transmission 14.

With the vehicle (not shown) at rest, transmission 14 (see FIGS. 1 and 2) is initially placed in Mode 1 (1 Motor Electric-Only Mode), with clutch C2 disengaged. Motor/generator 82 (M/G B) launches the vehicle, which then may be driven by purely electrical means using motor/generator 82 (M/G B). The top speed of a vehicle operating in Mode 1 (1 Motor Electric-Only Mode), as well as Mode 2 (Series Mode) described below, is therefore limited by a maximum design speed of motor/generator 82 (M/G B), which may also be used as needed to brake a vehicle employing powertrain 10. As there are no slipping clutches used while in Mode 1 (1 Motor Electric-Only Mode), the efficiency of Mode 1 is thereby maximized.

At relatively high rates of vehicle speed, motor/generator 82 (M/G B) will be operating at high speeds when powertrain 10 is in Mode 1 (1 Motor Electric-Only Mode). This situation may result in relatively inefficient operation under light loads, particularly with certain common motor types or designs. To reduce or minimize motor losses and/or to reduce the speed of motor 82 for other purposes or functions, powertrain 10 may alternately be operated in Mode 6 (2 Motor Electric-Only Mode). To transition directly from Mode 1 (1 Motor Electric-Only Mode) to Mode 6 (2 Motor Electric-Only Mode), brake C1 is opened or disengaged while clutch C2 is closed or engaged. In this manner, torque is commanded on motor/generator 80 (M/G A) to react the torque provided from motor/generator 82 (M/G B).

Motor/generator 80 (M/G A) may then be accelerated to a speed sufficient for providing a desirable power ratio between the motor/generators 80 and 82, and/or to a sufficient speed which minimizes losses between the motor/generators 80 and 82. Since the respective torques of motor/generators 80 and 82 are proportional to an available output torque of transmission 14, those skilled in the art will recognize that the speed ratio of motor/generator 80 (M/G A) to motor/generator 82 (M/G B) properly determines the power allocation between motor/generators 80 and 82. Mode 6 (2 Motor Electric-Only Mode) is also useful for sharing the losses between motor/generators 80 and 82 as noted above, providing an improved continuous power capability, as cooling is performed over two motors rather than just one, thus yielding proportionately greater cooling capability.

If it is desired to start the engine while in Mode 1 (1 Motor Electric-Only Mode), positive torque is commanded on motor/generator 80 (M/G A), thus causing engine 12 to increase speed in a positive direction. Once engine 12 reaches operating speed, it begins to produce torque. Motor/generator 80 (M/G A) can then transition to negative torque acting as a generator to thereby operate powertrain 10 in Mode 2 (Series Mode). Since motor/generator 82 (M/G B) is capable of meeting the full traction needs of the vehicle (not shown), maximum flexibility is allowed for engine 12 warm-up in order to maximize fuel economy and minimize cold start emissions.

If instead it is desired to start engine 12 while in Mode 6 (2 Motor Electric-Only Mode), powertrain 10 may be transitioned directly to Mode 3 (Output Split Mode) by closing clutch C3, thus causing engine 12 to start. Alternately, powertrain 10 may be shifted synchronously to Mode 1 (1 Motor Electric-Only Mode) and engine 12 may be started as explained above.

For cruising conditions, transmission 14 may be shifted from Mode 2 (Series Mode) to Mode 3 (Output Split Mode) by releasing brake C1 and applying clutch C2. This may be implemented as a conventional clutch-to-clutch shift under load. Alternately, clutch C3 may be released to allow independent control of the speed of engine 12 and of motor/generator 80 (M/G A) during a shift of transmission 14 to allow the shift to be executed synchronously without requiring the speed of engine 12 to be reduced to zero.

In Mode 3 (Output Split Mode), powertrain 10 operates in an output split configuration. In Mode 3, motor/generator 80 (M/G A) normally generates a portion of the engine torque which is transmitted to motor/generator 82 (M/G B). Powertrain 10 has a mechanical point at the ratio where motor/generator 82 has zero speed. For all ratios below this value, power will flow in the forward direction. For ratios above this value, motor/generator 82 (M/G B) speed will be negative, normally causing it to generate and supply power to motor/generator 80 (M/G A). Depending on the amount of battery charge or discharge power, it is possible for both motor/generators 80 and 82 to generate or motor simultaneously.

For accelerating, powertrain 10 may shift from Mode 3 (Output Split Mode) to Mode 2 (Series Mode) by releasing clutch C2 and applying brake C1. This may be implemented as a conventional clutch-to-clutch shift under load. Alternately, clutch C3 may be released to allow independent control of the speed of engine 12 and of motor/generator 80 (M/G A) during a shift of transmission 14. In this manner, the inertia and torque of motor/generator 80 (M/G A) are allowed to react motor/generator 82 (M/G B) as motor/generator 80 (M/G A) speed decreases to zero during the shift event without requiring a decrease in speed of engine 12, thus increasing output torque capability during the shift, and providing engine behavior expected by a driver of a vehicle (not shown) having powertrain 10 of the invention.

Powertrain 10 may be started and transitioned directly from Mode 1 (1 Motor Electric-Only Mode) to Mode 3 (Output Split Mode) by several different means. For an online start, clutches C2 and C3 are closed while engine 12 and motor/generator 80 (M/G A) are at zero speed, and brake C1 is opened. Positive torque on motor/generator 80 (M/G A) is then commanded to provide sufficient reaction torque to a planetary gearset represented by lever 20 (see FIG. 1), as well as to accelerate engine 12. Once engine 12 reaches operating speed, engine 12 begins to produce torque, and torque from motor/generator 80 (M/G A) may be removed.

Alternately, for an offline start with a clutch-to-clutch shift, clutch C3 is closed and clutch C2 is opened while motor/generator 80 (M/G A) and engine 12 are at zero speed. Positive torque is commanded on motor/generator 80 (M/G A) to start engine 12 while engine 12 is disconnected. Once engine 12 is started, a clutch-to-clutch shift from Mode 2 (Series Mode) to Mode 3 (Output Split Mode) is executed by opening brake C1 and closing clutch C2.

Finally, for an offline start with a synchronous shift, clutch C3 is closed and clutch C2 is opened while motor/generator 80 (M/G A) and engine 12 are at zero speed. Positive torque is commanded on motor/generator 80 (M/G A) to start engine 12 while engine 12 is disconnected. Once engine 12 is started, clutch C3 is opened, motor/generator 80 (M/G A) is decelerated to zero speed, and clutch C2 is closed while brake C1 is opened. Positive torque is then commanded on motor/generator 80 (M/G A) to react the torque of motor/generator 82 (M/G B), and to accelerate to engine speed, at which point clutch C3 is closed in order to engage engine 12.

Powertrain 10 includes an output split mode in Mode 3, as described hereinabove, and therefore power from engine 12 and motor/generators 80, 82 may be combined additively at ratios below the mechanical point to utilize both battery and engine power, i.e. power from ESD 86 (see FIG. 2) and engine 12. For example, at a 1:1 transmission ratio, the speeds of motor/generators 80, 82, and engine 12 are all equal to output speed, and motor/generators 80, 82 and engine 12 can therefore be combined to provide high vehicle performance.

Figure 5A:
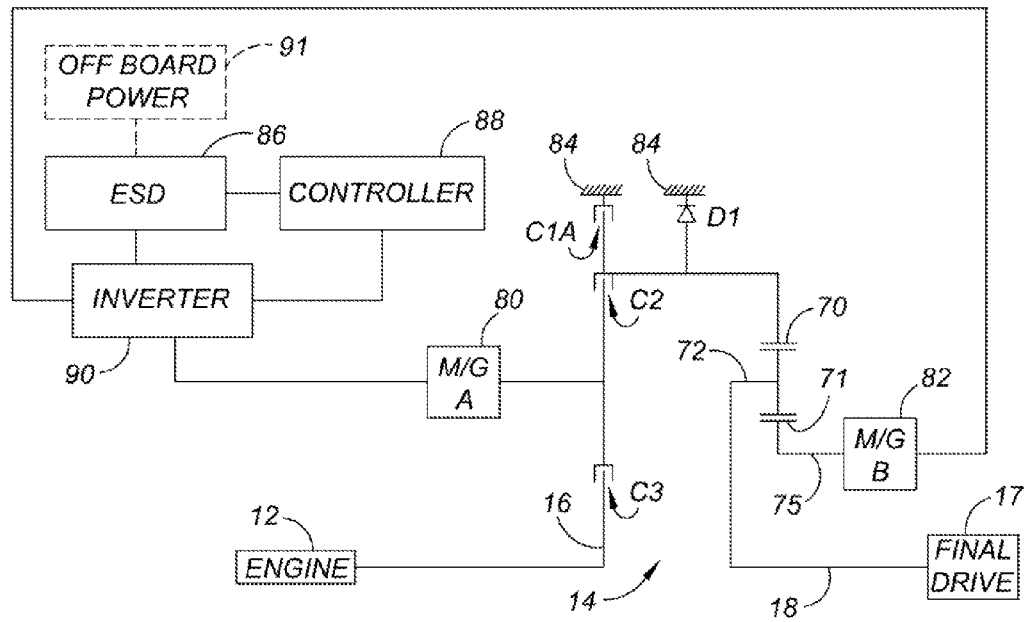
FIG. 5a is a stick diagram of an alternate embodiment of the transmission of FIG. 3.

Referring to FIG. 5*a*, an alternate embodiment of powertrain 10 of FIG. 2 is shown in which alternate clutch or brake C1A, which may be configured either a friction clutch or a dog clutch, is used in conjunction with a one-way clutch D1. Brake C1A and one-way clutch D1 are positioned in parallel to further reduce losses in transmission 14. Such a parallel arrangement may, for example, minimize or eliminate the need for dedicating hydraulic pressure for retaining brake C1 of FIGS. 1 and 2 in a closed position when powertrain 10 is operated in Mode 1 (1 Motor Electric-Only Mode). Brake C1A enables low loss forward operation, regenerative braking functionality, and reverse vehicle operation. Such a one-way clutch configuration would allow positive synchronization across brake C1A, which itself may enable use of a dog clutch therein. Alternately, the functionality of brake C1A and one-way clutch D1 may be a provided by a single device such as a lockable one-way clutch, as will be understood by those of ordinary skill in the art.

Referring briefly back to FIGS. 1 and 2, an alternate two-clutch embodiment of powertrain 10 of FIG. 1 is shown in phantom, with clutch C3 removed from transmission 14 to allow engine 12 to be continuously connected with motor/generator 80 (M/G A) through input member 16. Referring to FIG. 3*b*, a truth table is shown for this alternate two-clutch embodiment, which provides five instead of six operating modes. The five operating modes are summarized as Mode 1 (1 Motor Electric-Only Mode), Mode 2 (Series Mode), Mode 3 (Output Split Mode), Mode 4 (Neutral Mode), and Mode 5 (Neutral/Battery Charge Mode).

Using this alternate two-clutch embodiment, Mode 6 (see FIG. 3*a*) is disabled due to the continuous connection between input member 16 and node C, along with the preferred added functionality the presence of clutch C3 adds to powertrain 10. However, the alternate two-clutch embodiment omitting clutch C3 may be preferable for certain purposes, such as to simplify the design of powertrain 10 while still enabling certain operating modes. For example, online and offline start conditions as described above remain enabled in the alternate embodiment, thus providing smooth transitions from "engine off" to "engine on" conditions. Additionally, as with the embodiment described with reference to FIGS. 1 and 3A, the speed of motor/generator 82 (M/G B) is also reduced when operated in Mode 3, reducing losses and eliminating restrictions on vehicle top speed due to the limitations of the speed of motor/generator 82 (M/G B). As the vehicle is preferably designed such that engine 12 is on when the vehicle is traveling at relatively high speeds, the speed requirements of motor/generator 82 (M/G B) are reduced, as are losses in motor/generator 82 (M/G B), and therefore the efficiency of high speed operation is improved.

Figure 5B:
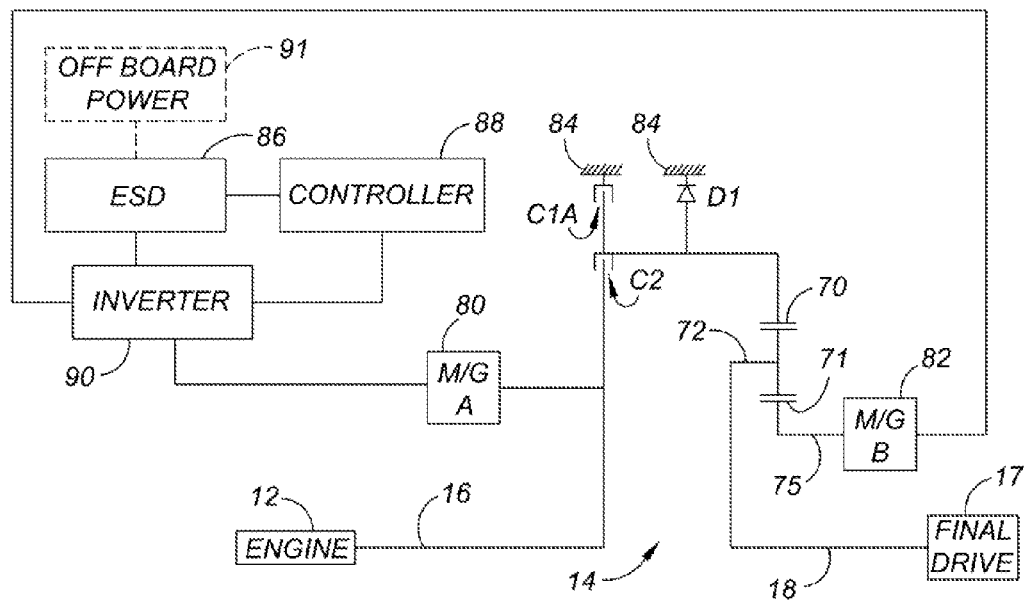
FIG. 5b is a stick diagram of an alternate embodiment of the transmission of FIG. 5A.

Referring to FIG. 5*b*, an alternate embodiment of the two-clutch version of powertrain 10 shown in FIGS. 1 and 2 is depicted having optional one-way clutch D1 positioned in parallel with brake C1A, as described previously above with reference to FIG. 5*a*. As previously disclosed, brake C1A may be either a friction clutch or a dog clutch positioned in parallel with one-way clutch D1. Alternately, the functionality of brake C1A and one-way clutch D1 may be a provided by a single device such as a lockable one-way clutch, as will be understood by those of ordinary skill in the art.

While the best modes for carrying out the invention have been described in detail, those familiar with the art to which this invention relates will recognize various alternative designs and embodiments for practicing the invention within the scope of the appended claims.

The invention claimed is:

1. An electrically-variable transmission (EVT) comprising:
   an input member configured for operative interconnection with an engine;
   an output member;
   a stationary member;
   first and second motor/generators;
   a planetary gear set representable by a first three-node lever having a first, a second, and a third node; and
   a first and a second torque-transmitting mechanism that are selectively engagable alone or in different combinations for establishing an electric-only mode, a series mode, an output split mode, and a neutral mode, wherein said first torque-transmitting mechanism is selectively engagable to connect said third node to said stationary member, and wherein said second torque-transmitting mechanism is selectively engagable to connect said first motor/generator to said third node;
   wherein one of said first and said second torque-transmitting mechanisms is selectively disengagable to disconnect said engine from said third node to enable start of said engine when said engine is disconnected from said EVT; and
   wherein engagement of said first torque-transmitting mechanism establishes said electric-only mode and said series mode, engagement of said second torque-transmitting mechanism establishes said output split mode, and disengagement of said first and said second torque-transmitting mechanisms establishes said neutral mode.

2. The EVT of claim 1, further comprising a third torque-transmitting mechanism that is selectively disengagable for disconnecting said first motor generator from said input member to establish an additional electric-only mode, said additional electric-only modes being a two-motor electric-only mode for minimizing losses across both of said first and said second motor/generators and for reducing an operating speed of said second motor/generator.

3. The EVT of claim 2, further comprising an energy storage device, wherein disengagement of said first and said second torque-transmitting mechanisms and engagement of said third torque transmitting mechanism establishes an additional neutral mode, said additional neutral mode being a battery charge mode operable for charging said energy storage device using power generated by said first motor/generator.

4. The EVT of claim 2, wherein the EVT is operable for starting said engine while the EVT is in said series mode, and is further operable for transitioning directly from said series mode to said output split mode by momentarily disengaging said third torque-transmitting mechanism while in said series mode to thereby decouple said engine from said EVT while synchronously transitioning to said output split mode.

5. The EVT of claim 1, wherein said plurality of torque-transmitting mechanisms further includes a one-way clutch positioned in parallel with said first torque-transmitting mechanism, and wherein said first torque-transmitting mechanism is selected from the group of friction clutch or dog clutch.

6. The EVT of claim 1, wherein said first torque-transmitting mechanism is a lockable one-way clutch.

7. The EVT of claim 1, wherein the EVT is operable for transitioning directly from said electric-only mode to said output split mode via at least one of an online start of said engine, an offline start of said engine with clutch-to-clutch shift, and an offline start of said engine with a synchronous shift, said offline start of said engine being a start up of said engine occurring while said engine is connected only to said first motor/generator and not to said output member.

8. The EVT of claim 1, further comprising:
an energy storage device operatively connected to said first and said second motor/generators for providing power to and receiving power from said first and said second motor/generators; wherein said energy storage device is configured to be operatively connectable with an off-board power supply for recharging said energy storage device;
wherein engagement of two of said torque-transmitting mechanisms establishes said electric-only mode such that said input member does not rotate and said second motor/generator acts as a motor utilizing power from the recharged said energy storage device to provide driving torque at said output member.

9. The EVT of claim 1, wherein said planetary gear set includes a sun gear member, a ring gear member, and a carrier member, said sun gear member being continuously connected to said second motor/generator, said ring gear member being selectively connectible to said first motor/generator through said second torque-transmitting mechanism and selectively connectible to said stationary member through said first torque-transmitting mechanism, and said carrier member is continuously connected to said output member.

10. A hybrid powertrain having an electrically-variable transmission (EVT), the hybrid powertrain comprising:
an engine;
an input member;
an output member;
a stationary member;
first and second motor/generators;
an energy storage device operatively connected to each of said first and said second motor/generators for providing power to and receiving power from said first and second motor/generators, wherein said energy storage device is configured to be operatively connectable with an off-board power supply for recharging said energy storage device; and
a first planetary gear set representable by a first three-node lever of a lever diagram having a first node, a second node, and a third node;
wherein said first motor/generator and said input member are selectively connectable with said third node, said second motor/generator is continuously connected with said first node, and said second node is continuously connected for common rotation with said output member;
a first torque-transmitting mechanism selectively engagable to connect said third node to said stationary member; and
a second torque-transmitting mechanism selectively engagable to connect said first motor/generator with said third node;
wherein engagement of selected ones of said first and said second torque-transmitting mechanisms alone or in different combinations establishes a forward electric-only mode, a series mode, an output split mode, and a neutral mode.

11. The hybrid powertrain of claim 10, wherein said EVT is operable for transitioning from said output split mode to said forward electric-only mode via synchronous shift to an appropriate speed ratio of said EVT and engagement of said first torque-transmitting mechanism, said forward electric-only mode being a one motor electric-only mode.

12. The hybrid powertrain of claim 10, further comprising a third torque-transmitting mechanism operable for establishing an additional forward electric-only mode, said additional electric-only modes being a two motor electric-only mode; wherein said neutral mode of said EVT includes a purely neutral mode in which said second motor/generator is disconnected from said output member by disengagement of said third torque transmitting mechanism, and a neutral battery charge mode operable for charging said energy storage device upon engagement of said third torque transmitting mechanism to connect said first motor/generator to said engine and disengagement of said first and said second torque-transmitting mechanisms.

13. The hybrid powertrain of claim 10, wherein said first planetary gear set includes a sun gear member, a ring gear member, and a carrier member, said sun gear member being continuously connected to said second motor/generator, said ring gear member being selectively connectible to said first motor/generator through said second torque-transmitting mechanism and selectively connectible to said stationary member through said first torque-transmitting mechanism, and said carrier member is continuously connected to said output member.

14. The hybrid powertrain of claim 13, further comprising a one-way clutch, wherein said first torque-transmitting mechanism is selected from the group of friction clutch and dog clutch, and wherein said first torque-transmitting mechanism is positioned in parallel with said one-way clutch.

15. The hybrid powertrain of claim 13, wherein said first torque-transmitting mechanism is a lockable one-way clutch for enabling low loss forward operation, regenerative braking functionality, and reverse vehicle operation of the hybrid powertrain.

16. A hybrid powertrain comprising:
an engine;

an electrically-variable transmission having an input member and output member, said input member being selectively connectable to said engine;
a stationary member;
first and second motor/generators;
an energy storage device operatively connected to each of said first and said second motor/generators for providing power to and receiving power from said first and second motor/generators, wherein said energy storage device is configured to be operatively connectable with an off-board power supply for recharging said energy storage device;
a first planetary gear set representable by a first three-node lever of a lever diagram having a first node, a second node, and a third node;
a first torque-transmitting mechanism selectively engagable to connect said third node to said stationary member;
a second torque-transmitting mechanism selectively engagable to connect said first motor/generator with said third node;
a third torque-transmitting mechanism selectively engagable to connect said engine with said first motor/generator, wherein engagement of said first, said second, and said third torque-transmitting mechanism alone or in different combinations establishes six operating modes including a one-motor electric-only mode in which said engine is normally off, a series mode in which said engine is normally on, an output split mode, a neutral mode, a neutral battery charge mode, and a two-motor electric-only mode in which the engine is normally off;
wherein said first motor/generator and said input member are selectively connectable with said third node via said second torque-transmitting mechanism, said second motor/generator is continuously connected with said first node, and said second node is continuously connected for common rotation with said output member; and
wherein engagement of said first torque-transmitting mechanisms and disengagement of said second torque transmitting mechanism establishes an electric-only mode in which said input member does not rotate and said second motor/generator acts as a motor utilizing power from the recharged said energy storage device to provide driving torque at said output member.

17. The hybrid powertrain of claim 16, wherein said first planetary gear set includes a sun gear member, a ring gear member, and a carrier member, said sun gear member being continuously connected to said second motor/generator, said ring gear member being selectively connectible to said first motor/generator through said second torque-transmitting mechanism and selectively connectible to said stationary member through said first torque-transmitting mechanism, and said carrier member being continuously connected to said output member.

18. The hybrid powertrain of claim 17, wherein the hybrid powertrain is operable for starting said engine when said engine is disconnected from said first planetary gear set during said series mode, thereby providing an optimal transition from an engine-off to an engine-on condition.

19. The hybrid powertrain of claim 16, wherein said neutral mode describes a condition in which said second motor/generator is disconnected from said output member by disengagement of said third torque transmitting mechanism, and wherein said neutral battery charge mode operable for charging said energy storage device upon engagement of said third torque transmitting mechanism to connect said first motor/generator to said engine.

20. The hybrid powertrain of claim 16, further comprising a dog clutch, wherein said first torque-transmitting mechanism is a one-way clutch in parallel with said dog clutch for enabling low loss forward operation, regenerative braking functionality, and reverse vehicle operation of the hybrid powertrain.

21. The hybrid powertrain of claim 16, wherein said first torque-transmitting mechanism is a lockable one-way clutch for enabling low loss forward operation, regenerative braking functionality, and reverse vehicle operation of the hybrid powertrain.

* * * * *